United States Patent
Peterson et al.

(10) Patent No.: US 12,495,209 B2
(45) Date of Patent: Dec. 9, 2025

(54) CAMERA FOCUS BASED ON SUBJECT PRIORITY

(71) Applicant: Lenovo (Singapore) Pte. Ltd., Singapore (SG)

(72) Inventors: Nathan Peterson, Morrisville, NC (US); Arnold Weksler, Morrisville, NC (US); Russell Speight VanBlon, Morrisville, NC (US); Mark Delaney, Morrisville, NC (US); John C. Mese, Morrisville, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 173 days.

(21) Appl. No.: 18/192,392

(22) Filed: Mar. 29, 2023

(65) Prior Publication Data
US 2024/0334051 A1 Oct. 3, 2024

(51) Int. Cl.
*H04N 23/67* (2023.01)
*H04N 23/60* (2023.01)
*H04N 23/611* (2023.01)

(52) U.S. Cl.
CPC ......... *H04N 23/675* (2023.01); *H04N 23/611* (2023.01); *H04N 23/64* (2023.01)

(58) Field of Classification Search
CPC ..... H04N 23/675; H04N 23/611; H04N 23/64
See application file for complete search history.

(56) References Cited

U.S. PATENT DOCUMENTS

| | | | |
|---|---|---|---|
| 2008/0080846 A1* | 4/2008 | Grip | H04M 1/0264 348/E5.045 |
| 2008/0122939 A1* | 5/2008 | Hirai | H04N 23/675 348/222.1 |
| 2011/0267530 A1* | 11/2011 | Chun | G06F 3/04883 348/E5.045 |
| 2013/0169853 A1* | 7/2013 | Luong | H04N 23/611 348/E5.045 |
| 2016/0021293 A1* | 1/2016 | Jensen | G06V 40/16 348/349 |
| 2017/0026565 A1* | 1/2017 | Hong | G06V 40/161 |
| 2018/0063411 A1* | 3/2018 | Rivard | H04N 23/743 |
| 2018/0285652 A1* | 10/2018 | Dey | G06V 20/52 |
| 2019/0215440 A1* | 7/2019 | Rivard | G06V 10/22 |
| 2020/0007781 A1* | 1/2020 | Aoba | G06N 3/08 |
| 2023/0136191 A1* | 5/2023 | Chang | H04N 23/90 348/169 |

* cited by examiner

*Primary Examiner* — Timothy J Henn
(74) *Attorney, Agent, or Firm* — John M. Rogitz; John L. Rogitz

(57) ABSTRACT

In one aspect, a device includes a processor and storage accessible to the processor. The storage includes instructions executable by the processor to determine on which of a first person and a second person to auto-focus using a digital camera, with the determination being based on data that indicates a priority of which person to focus on. Based on the determination, the instructions are executable to control the camera to auto-focus on one of the first and second people and to generate an image using the camera according to the auto-focus.

17 Claims, 4 Drawing Sheets

CAMERA FOCUS BASED ON SUBJECT PRIORITY

FIELD

The disclosure below relates to technically inventive, non-routine solutions that are necessarily rooted in computer technology and that produce concrete technical improvements. In particular, the disclosure below relates to digital camera auto-focusing based on priority.

BACKGROUND

Digital cameras can often perform actions that humans themselves cannot perform with cameras. For instance, humans do not have the reaction time to adequately focus a camera during a super high-speed action shot with multiple subjects in the field of view and a variable focal length for each subject. Auto-focusing can be used to help address this issue, but as recognized herein, current auto-focusing is too indiscriminate in what it chooses to focus on and often merely selects a nearest object on which to focus. Given this inadequacy, the disclosure below recognizes that additional technological advancements are desirable.

SUMMARY

Accordingly, in one aspect a device includes at least one processor and storage accessible to the at least one processor. The storage includes instructions executable by the at least one processor to receive input from a camera and to identify, based on the input, a first person and a second person. The instructions are also executable to access data to determine on which of the first and second people to focus. Based on a determination to focus on the first person, the instructions are executable to control the camera to focus on the first person. Based on a determination to focus on the second person, the instructions are executable to control the camera to focus on the second person.

In various example implementations, the data may indicate a familial relationship between a third person and one or both of the first person and the second person. The data may additionally or alternatively indicate a friend relationship between a third person and one or both of the first person and the second person. Still further, the data may indicate that one of the first and second people have been imaged by the camera in the past, and here the camera may be controlled to focus on the one of the first and second people imaged by the camera in the past. Also in certain example implementations, the data may be accessed via a social media platform, the data may indicate a relationship between a third person and the first person, and the camera may be controlled to focus on the first person based on the data indicating the relationship.

As another example, in addition to or in lieu of the foregoing, the data may be accessed via a contacts list of a third person, the data may indicate an image of the first person, and the camera may be controlled to focus on the first person based on a facial recognition match of the first person as appearing in the image to the first person as appearing in the input from the camera.

Still further, if desired the data may be pre-cached in a storage location accessible to a camera application ("app") used to control the camera to focus on people, and the device may even include the camera itself.

In another aspect, a method includes receiving input from a camera and identifying, based on the input, a first person and a second person. The method also includes accessing data associated with a third person to determine on which of the first and second people to auto-focus, where the third person is different from the first and second people. Based on determining to auto-focus on the first person, the method includes controlling the camera to auto-focus on the first person for generation of an image. Based on determining to auto-focus on the second person, the method includes controlling the camera to auto-focus on the second person for generation of the image.

Thus, in certain example embodiments the method may include determining via the data that the third person has a first relationship to the first person, where the first relationship has a first weight. The method may also include determining via the data that the third person has a second relationship to the second person, where the second relationship has a second weight lower than the first weight. The method may then include determining to auto-focus on the first person based on the first relationship having a higher weight than the second relationship, and then auto-focusing on the first person using the camera based on the determining to auto-focus on the first person.

In various examples, the data may include a familial relationship between the third person and one or both of the first person and the second person. The data may also indicate a friend relationship between the third person and one or both of the first person and the second person. Additionally or alternatively, the data may indicate that the first person has been previously imaged via the camera more than the second person has been previously imaged via the camera, and here the method may then include controlling the camera to auto-focus on the first person based on the first person having been previously imaged via the camera more than the second person.

Still further, in certain example implementations the data may be accessed via a social media platform. So, for example, the data from the social media platform may indicate a relationship between the third person and the first person and the method may include controlling the camera to auto-focus on the first person based on the data indicating the relationship.

Also in certain example implementations, the data may be accessed via a contacts list associated with the third person. So, for example, the contacts list may indicate an image of the first person, and the method may include controlling the camera to auto-focus on the first person based matching, using facial recognition, the first person as appearing in the image to the first person as appearing in the input from the camera.

In still another aspect, at least one computer readable storage medium (CRSM) that is not a transitory signal includes instructions executable by at least one processor to determine on which of a first person and a second person to auto-focus using a digital camera. The determination is based on data that indicates a priority of which person to focus on. Based on the determination, the instructions are executable to control the camera to auto-focus on one of the first and second people and to generate an image using the camera according to the auto-focus.

In various examples, the priority may weight a familial relationship higher than other factors, and/or weight people that have been imaged by the camera in the past higher than other factors.

The details of present principles, both as to their structure and operation, can best be understood in reference to the accompanying drawings, in which like reference numerals refer to like parts, and in which:

DETAILED DESCRIPTION

Figure 1:
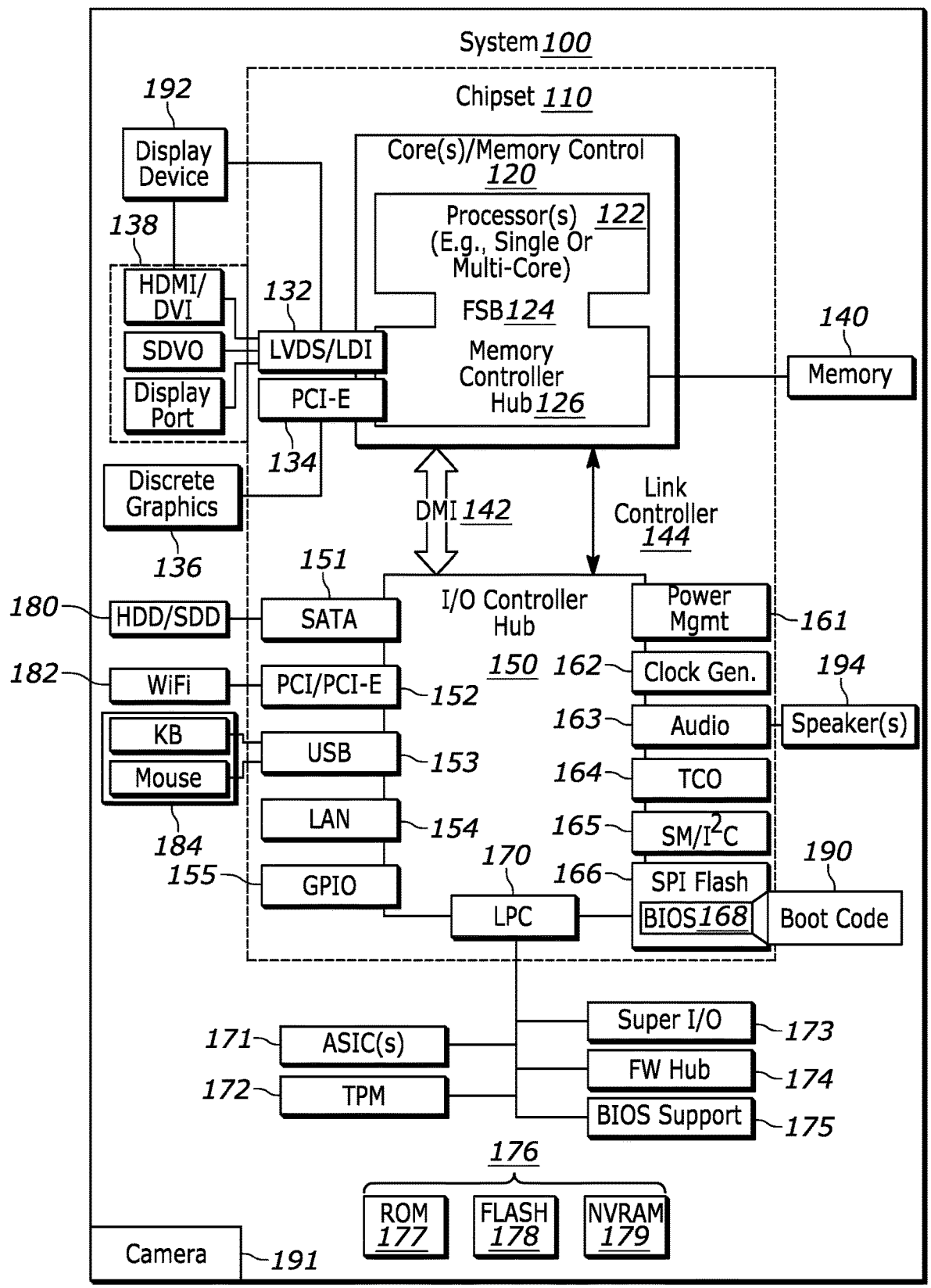
FIG. 1 is a block diagram of an example system consistent with present principles.

Among other things, the detailed description below describes how a device can generate a good, quick photo of a person that is associated with the device's user. Specific people known to the user may therefore be identified on the fly while the user takes the photo. In one specific example, camera auto-focus may be used with facial recognition that utilizes faces associated with the user to determine to focus on those faces over others.

In more detail, in one example a digital camera can be used to detect that there are multiple faces within the camera's field of view (FOV). Based on the device already creating a set of identity profiles within the camera that can be used when taking photos, the device may execute facial detection to pick the person that is important to the user rather than just auto-focusing on other random faces. Thus, when this auto-focus assist with facial recognition is triggered, the device may not only identify faces but also identify people from a list of known individuals, whether those individuals are family members, friends, work/business associates, or others. The people's information can be imported into the camera software via social media or other sources, and the camera may even learn important people based on the common faces in photos that have been taken previously. The known faces/list may then be stored in the camera app so that when the auto-focus assist is triggered in real time, the device may auto-focus on one of the people from the list rather than other people not on the list (and/or on the list but having a lower priority) to generate a photo focusing on the selected person. This allows for easier and faster precision photos for intended targets. Present principles may apply to stand-alone cameras, cameras on mobile devices and wearables, cameras on headsets, cameras on desktop computers, etc.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a camera 191 that gathers one or more images and provides the images and related input to the processor 122. The camera may be a digital camera, a thermal imaging camera, an infrared (IR) camera, a three-dimensional (3D) camera, and/or another type of image sensor integrated into the system 100 and controllable by the processor 122 to gather still images and/or video.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Still further, the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
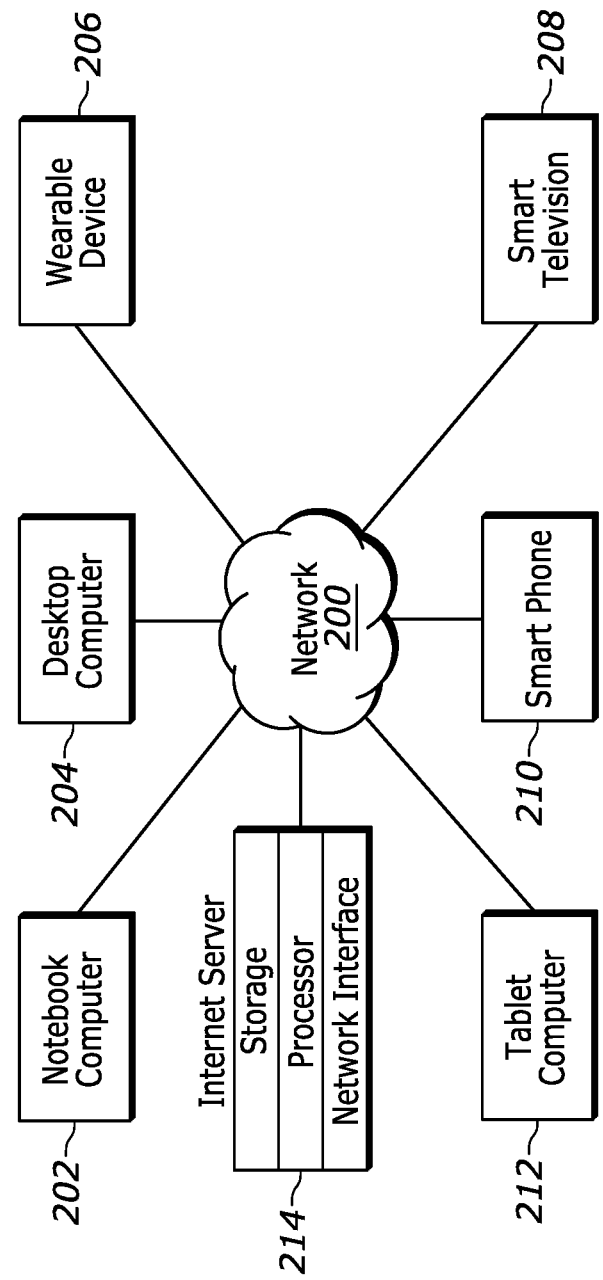
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles and may also each include a camera like the camera 191 to undertake present principles.

Figure 3:
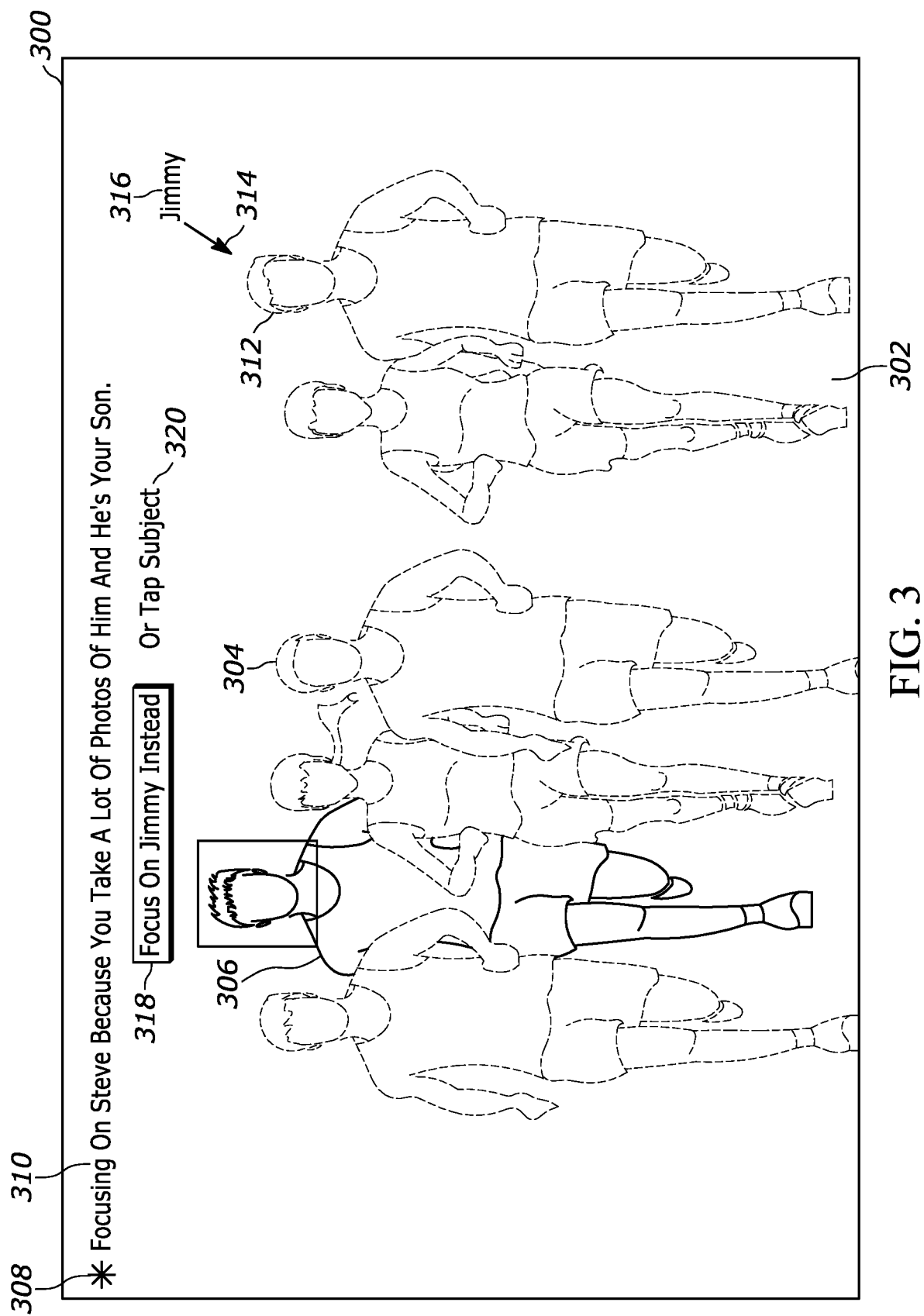
FIG. 3 shows an example graphical user interface (GUI) that may be presented on a client device display consistent with present principles to show a live feed from a camera, with auto-focusing being used to focus on a subject relevant to the user rather than a subject not relevant the user.

Now in reference to FIG. 3, suppose a parent wants to take a photograph of people in a track meet footrace in which his son is competing. The parent opens his camera application ("app") on his device, activating the device's digital camera. The device may be a smartphone, tablet computer, wearable device, headset like AR smart glasses, etc. FIG. 3 shows an example graphical user interface (GUI) 300 that may therefore be presented on the display of the parent's device in response to launching the camera app, with the GUI 300 showing the real-time viewfinder live feed 302 from the camera before the user actually provides a command to capture and store an image/photograph.

The parent's device may also execute facial/object recognition using the live feed 302 to identify the respective faces of the people shown in the live feed 302 as potential subjects on which to focus. But absent present principles, the device's processor (e.g., and the camera app specifically) might simply auto-focus on the person 304 based on the person 304 being the one having the shortest focal length for focusing and/or being the most-proximate of the identified potential subjects relative to the parent's own device. This might result in generation of a digital photo that is auto-focused incorrectly, with the photo focused on an incorrect subject while leaving the intended subject (the son) blurry and out of focus in the photo that is ultimately generated and stored.

However, by adopting present principles the device may instead attempt to prioritize the people shown in the live feed 302 to focus on a person with the highest priority for the user. The device may access data from a variety of sources to do so, including from a contacts list of the parent, a social media account/profile of the parent (e.g., Facebook or Twitter account), and/or other data sources indicating various types of relationships between the parent and one or more people. So as one example, social media data may indicate friend and familial relationships between the parent and others, and familial relationships may be weighted higher than friend relationships for focus prioritization. Additionally, different types of familial relationships might be weighted more than others so that the parent's immediate family members (e.g., mother, father, spouse, and children) are weighted higher than other more-distant members of the parent's family tree (e.g., cousins, aunts, uncles, etc.).

So in the present example, one of the runners 306 named Steve has been identified as the parent's son. As such, the camera app may control the device's digital camera to focus on Steve as shown in the live feed 302 itself, and to focus on Steve for generating a subsequent still photograph or video for persistent storage. So once the parent provides a command to generate and store the still photograph or video (e.g., using voice command or button press), the parent's device may generate and store the photo or video as focused on the runner 306 so that the runner's appearance appears crisp and in-focus. Also note that the box shown around the head of the runner 306 may be presented on the display to highlight to the parent the device's determination to focus on Steve/the runner 306.

FIG. 3 also shows that the GUI 300 may include a non-text graphical icon 308 and text 310 prompting the parent that the runner 306 is being focused on because the runner 306 is the son of the parent, and also because the parent takes a high volume of photographs of the runner 306 (another example criteria).

However, also suppose that the camera app identified another one of the runners as also having an association to the parent, but that this association is weighted lower than the association(s) between the parent and the runner/son 306. Here the camera app may overlay on the live feed 302 an arrow 314 and name 316 for the runner 312 to direct the parent's attention to the runner 312 in case the parent wants to focus on that person instead. The camera app may therefore present a selector 318 that is selectable via touch, cursor, or other input to quickly command the camera app and/or digital camera itself to auto-focus on the runner 312 at a different focal length than the runner 306 (rather than focusing on the runner 306 himself). Additional instructions 320 may also be presented to inform the parent that the parent can also tap on another subject besides the runners 306, 312 to instead command the app/camera to focus on that other subject. It may thus be appreciated that the parent's device may auto-focus and capture images swiftly and correctly according to an intended target subject (the user's son) during a high-speed event.

Figure 4:
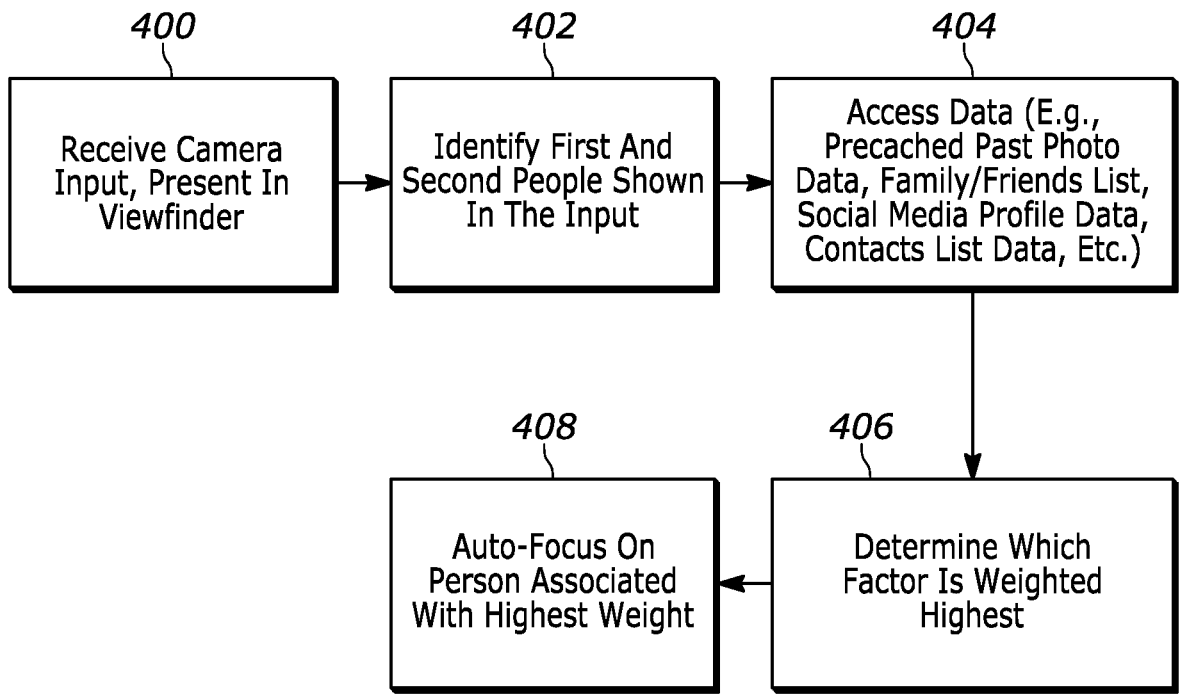
FIG. 4 illustrates example logic in example flow chart format that may be executed by a device consistent with present principles.

Turning now to FIG. 4, it shows example logic that may be executed by a client device and/or remotely-located server in any appropriate combination consistent with present principles. For example, the logic of FIG. 4 may be executed by the parent's smartphone according to the example above. And note that while the logic of FIG. 4 is shown in flow chart format, other suitable logic may also be used.

Beginning at block 400, the device may receive input from a digital camera to which it has access, such as a front or rear camera on a smartphone. Also at block 400, the device may present the input as a live feed as described above. From block 400 the logic may then proceed to block 402 where the device may identify first and second people shown in the input. The device may use object and/or facial recognition to do so, though other suitable techniques may also be used. Additionally, note here than in some specific non-limiting examples, the device may identify at least two people in the input to continue on with the logic to prioritize the people for focusing, and otherwise may simply auto-focus on a single person shown in the input. And further still, if no people are shown in the input or at least if no person relevant to the user is shown, the device may elect to auto-focus on something else instead. For example, the device may elect to focus on a dog or other pet that is determined to be associated with/relevant to the user (based on network-accessible data and/or past imaging of the same subject) over another animal or inanimate object that is not associated with the user. Also, inanimate objects determined to be relevant to the user may be auto-focused on above other inanimate objects that are not relevant to the user.

In any case, from block 402 the logic may then proceed to block 404. At block 404 the device may access data to determine on which of the first and second people to focus. The data may even be pre-cached within the camera app's reserved storage, whether that be local storage on the client device itself and/or cloud storage on a remotely-located server. But regardless of where stored, in certain specific non-limiting examples the cached data for each person may be separated into a respective identify profile for that person for the profile to then be efficiently accessed at a later time for focus prioritization consistent with present principles.

The data itself that is accessed at block 404 may indicate different relationships and/or other data connecting the device's user to one or more of other people. The data may be pulled from a variety of sources, such as the user's profile/account for a particular social media platform or even the user's contacts list, either of which might have already been programmed with familial and friend relationships that exist between the device's user and others. A social media friends list for the user may also be used to designate anyone appearing in the list as at least a friend of the user (e.g., if not family member if that person has the same last name as the user per the friends list). Facial feature data for the other person may then be pulled from that person's own social media profile picture (or other picture), and/or pulled from a picture of that person as stored as part of the user's contacts list, for subsequent facial recognition for camera focus prioritization.

Additionally or alternatively, even if social media metadata or text data does not indicate such relationships between the user and others, photos that are simply stored on the social media platform and that are connected to the user's own social media account (e.g., photos posted by the user themselves and/or photos in which the user is tagged) may be used to match via facial recognition the faces of other people shown in those existing social media images to the faces people shown in the camera's live feed itself to then auto-focus on a matched person over unmatched people. A face as simply appearing in a given photo for a given contact in the user's contact list may also be matched to a face shown in the live feed and therefore prioritized for focus over the faces of unmatched people.

Relationship data may be pulled from still other apps/sources as well. For example, a static family/friends list as manually entered into the device by the user themselves may be used, where the list indicates a particular relationship between the user and each of the entries in the list and where each entry is associated with a photo of that respective person (e.g., not a contacts list per se but rather a family tree listing or some other type of list). Data from online ancestry tracking services may also be used that indicates both relationship data and facial features for people with similar DNA and/or a same last name as the user.

As another example, data from the user's email account may be accessed, with natural language understanding (NLU) being executed on text of the user's emails to identify any text indicating a certain relationship between the user and another person. For example, the user might have begun a sent email with "Hi mom", which the NLU would then pick up on to determine that the email recipient is the mother of the user. The other person's face as shown in an email profile picture for that person (or as shown in another source connected to the email account, such as a Google profile) may then be used for the device to acquire facial recognition data for subsequent facial recognition matching to a potential auto-focus subject consistent with present principles.

Other data that may also be accessed at block 404 includes past photographs taken by the user using the same camera and/or client device specifically, or even just photographs taken by the user more generally regardless of what camera/device was used (e.g., photos stored in cloud storage for the user even if some of the photos were generated using a different camera than other photos). Facial and/or object recognition may then be executed on the past photos to identify how many times each different person has been captured in the photos so that one person later shown in a live feed can be auto-focused on above someone else also shown in the live feed based on the former being photographed more times in the past than the latter. In some examples, the device may even use a threshold for potential auto-focusing so as to only select people appearing in at least a threshold number of past photographs as potential subjects on which to focus later (e.g., to eliminate false positives). The device may even use a time-based rolling average so as to auto-focus on subjects more-recently photographed by the user over other subjects photographed farther in the past (e.g., again to eliminate false positives). Or as a combination, the device may for example only auto-focus on people appearing in at least ten photos over a most-recent two week period of time, and then if more than one person meets that criteria the device may select the person appearing in the most photos over that same period of time (or for all time/all photos).

Consistent with these types of processes, the logic of FIG. 4 may move from block 404 to block 406 where the device may determine which of the factors associating the user with different potential auto-focus subjects is weighted highest and then control the digital camera to auto-focus on the subject having a highest-weighted relationship to the user. For example, if the first person from the live feed is identified as a family member of the user and the second person from the live feed is identified as a friend of the user, family members may be weighted higher than friends and hence the camera app may control the camera to auto-focus on the first person rather than the lower-weighted second person for generating a still image or video.

Figure 5:
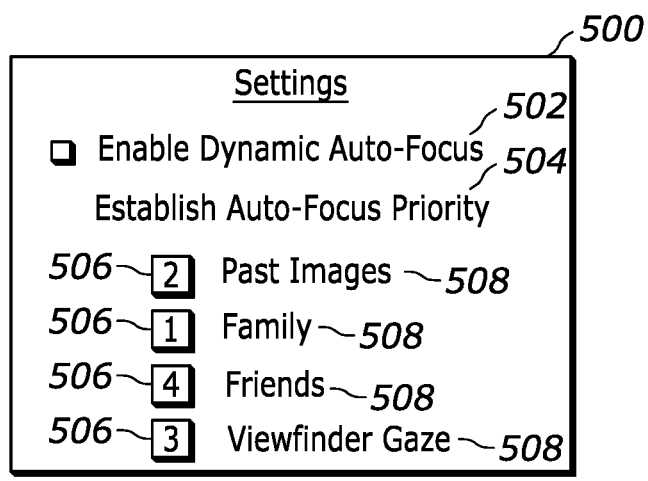
FIG. 5 shows an example settings GUI that may be presented on the client device's display to configure one or more settings of the device to operate consistent with present principles.

Continuing the detailed description in reference to FIG. 5, it shows an example GUI 500 that may be presented on the display of a client device to configure one or more settings of the client device to undertake present principles. The GUI 500 may be presented based on a user navigating a device or camera app menu, for example. The example options described below may be selected via touch, cursor, or other input directed to the associated check box per this example.

As shown in FIG. 5, the GUI 500 may include a first option 502 that may be selectable a single time to set/configure the device to, in multiple future instances, auto-focus on one potential subject over another based on priority as described herein. So, for example, selection of the option 502 may configure the device to in the future take the actions described above in reference to FIG. 3 as well as to execute the logic of FIG. 4.

The GUI 500 may also include a setting 504 at which the end-user may configure their own auto-focus priority. Number entry boxes 506 may therefore be presented for the end-user to rank/weight various respective factors 508 from highest to lowest. Example factors 508 are shown including appearance in past images, family relationships, friend relationships, and viewfinder gaze identification, though any other factors described herein may additionally or alternatively be listed as well. The user may thus enter whole numbers from one to N into the boxes 506 to establish the priority, with factors that were assigned lower numbers being weighted more than factors assigned higher numbers. For example, a factor assigned the number one may be weighted higher than a factor assigned the number four.

Describing the aforementioned viewfinder gaze identification in more detail, note that another factor that may be used for determining an auto-focus subject consistent with present principles may be the user's gaze direction toward a particular object as presented on the camera's live feed/viewfinder window itself. So, for example, a front camera on a front side of a smartphone (or another side that both faces the user and bears the device's display) may be used for the smartphone to execute eye tracking to identify the user's gaze direction toward a particular object shown on device's display. The device may then determine to auto-focus on the gazed-at object using the other camera on the other side of the smartphone based on the user looking at the object itself on the display's live feed.

Moving on from FIG. 5, note consistent with present principles that in addition to or in lieu of pre-caching data in local or remote persistent storage for auto-focusing as described above, the data may be pulled from the various data sources in real time while a live feed is presented. And for example implementations where pre-caching is in fact performed, the device or camera app may harvest new data/refresh previous data at regular intervals to stay up to date, such as checking social media platforms and the user's contact list once a week for updated data/associations.

Additionally, further note that if a conflict exists between two potential auto-focus subjects where each has an equal weight and/or is associated with a same highest-priority factor, the device may use a combination of factors instead and choose to auto-focus on the subject with the highest cumulative weight.

It may now be appreciated that present principles provide for an improved computer-based user interface that increases the accuracy, functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor; and
storage accessible to the at least one processor and comprising instructions executable by the at least one processor to:
receive input from a camera;
identify, based on the input, a first person and a second person;
execute one or more eye tracking algorithms to determine at which of the first person and the second person a third person is looking, the third person being a user of the camera;
based on a determination that the third person is looking at the first person, control the camera to focus on the first person and present first text indicating a first reason why the first person is being focused on a first non-text graphical icon indicating that the first person is being focused on; and
based on a determination that the third person is looking at the second person, control the camera to focus on the second person and present second text indicating a second reason why the second person is being focused on a second non-text graphical icon indicating that the second person is being focused on;
wherein at least one of the first and second reasons comprise the respective first or second person being shown in a high volume of images accessible to the at least one processor.

2. The device of claim 1, comprising the camera.

3. The device of claim 1, wherein the instructions are executable to:
based on the determination that the third person is looking at the first person, present first third text concurrently with presentation of the first non-text graphical icon, the first third text indicating that the first person is being focused on; and based on the determination that the third person is looking at the second person, present second fourth text concurrently with presentation of the second non-text graphical icon, the second fourth text indicating that the second person is being focused on.

4. The device of claim 1, wherein the instructions are executable to:
based on the determination that the third person is looking at the first person, present a first non-text graphical icon indicating that the first person is being focused on first text concurrently with presentation of the first non-text graphical icon, the first text indicating a first reason why the first person is being focused on; and
based on the determination that the third person is looking at the second person, present a second non-text graphical icon indicating that the second person is being focused on second text concurrently with presentation of the second non-text graphical icon, the second text indicating a second reason why the second person is being focused on.

5. The device of claim 1, wherein the high volume of images is established by a threshold number of images.

6. The device of claim 1, wherein the input is first input, and wherein the instructions are executable to:
access an email account associated with the third person and execute natural language understanding on text of the third person's emails to identify a relationship between the third person and a fourth person indicated in the third person's emails;
execute facial recognition on second input from the camera to determine that the fourth person is indicated in the second input; and
based on the identification of the relationship and the determination that the fourth person is indicated in the second input, control the camera to focus on the fourth person.

7. The device of claim 1, comprising a display on which the first and second non-text graphical icons are presentable.

8. A method, comprising:
receiving input from a camera;
identifying, based on the input, a first person and a second person;
executing one or more eye tracking algorithms to determine at which of the first person and the second person a third person is looking, the third person being a user of the camera;
based on determining that the third person is looking at the first person, controlling the camera to auto-focus on the first person for generation of an image and presenting first text indicating a first reason why the first person is being focused on first text indicating that the first person is being focused on; and
based on determining that the third person is looking at the second person, controlling the camera to auto-focus on the second person for generation of the image and presenting second text indicating a second reason why the second person is being focused on second text indicating that the second person is being focused on;
wherein at least one of the first and second reasons comprise the respective first or second person being shown in a high volume of images.

9. The method of claim 8, comprising:
based on determining that the third person is looking at the first person, presenting a first non-text graphical icon indicating that the first person is being focused on; and based on determining that the third person is looking at the second person, presenting a second non-text graphical icon indicating that the second person is being focused on.

10. The method of claim 8, comprising:
based on determining that the third person is looking at the first person, presenting third text indicating that the first person is being focused on a first reason why the first person is being focused on; and
based on determining that the third person is looking at the second person, presenting fourth text indicating that the second person is being focused on a second reason why the second person is being focused on.

11. The method of claim 8, wherein the high volume of images is established by a threshold number of images.

12. The method of claim 8, wherein the input is first input, and wherein the method comprises:
accessing an email account associated with the third person and execute natural language understanding on text of the third person's emails to identify a relationship between the third person and a fourth person indicated in the third person's emails;
executing facial recognition on second input from the camera to determine that the fourth person is indicated in the second input; and
based on the identification of the relationship and the determination that the fourth person is indicated in the second input, controlling the camera to auto-focus on the fourth person.

13. At least one computer readable storage medium (CRSM) that is not a transitory signal, the at least one CRSM comprising instructions executable by at least one processor to:
determine on which of a first person and a second person to auto-focus using a digital camera, the determination being based on execution of eye tracking to identify at which of the first person and the second person a third person is looking, the third person being a user of the digital camera;
based on the third person being identified as looking at the first person, control the camera to auto-focus on the first person and present first text indicating a first reason why the first person is being focused on; and
based on the third person being identified as looking at the second person, control the camera to auto-focus on the second person and present second text indicating a second reason why the second person is being focused on;
wherein at least one of the first and second reasons comprise the respective first or second person being shown in a high volume of images accessible to the at least one processor.

14. The at least one CRSM of claim 13, wherein the instructions are executable to:
based on the third person being identified as looking at the first person, present a first non-text graphical icon indicating that the first person is being focused on; and
based on the third person being identified as looking at the second person, present a second non-text graphical icon indicating that the second person is being focused on.

15. The at least one CRSM of claim 13, wherein the instructions are executable to:
based on the third person being identified as looking at the first person, present third text indicating a name of the first person; and based on the third person being identified as looking at the second person, present fourth text indicating a name of the second person.

16. The at least one CRSM of claim 13, wherein the high volume of images is established by a threshold number of images.

17. The at least one CRSM of claim 13, wherein the instructions are executable to:

access an email account associated with the third person and execute natural language understanding on text of the third person's emails to identify a relationship between the third person and a fourth person indicated in the third person's emails;

execute facial recognition on input from the camera to determine that the fourth person is indicated in the input; and based on the identification of the relationship and the determination that the fourth person is indicated in the input, control the camera to auto-focus on the fourth person.

* * * * *